No. 681,458. Patented Aug. 27, 1901.
W. W. PHILBRICK.
MATCHER HEAD.
(Application filed Aug. 28, 1900.)
(No Model.) 2 Sheets—Sheet 1.
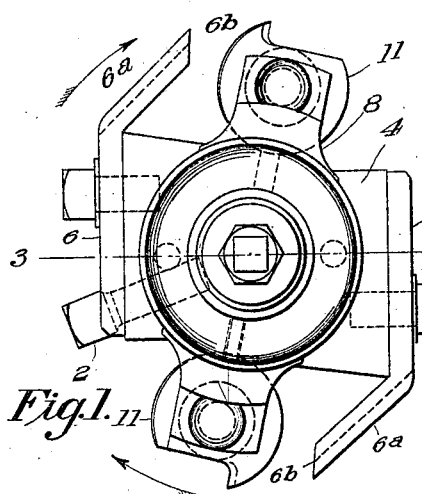
Fig. 1.
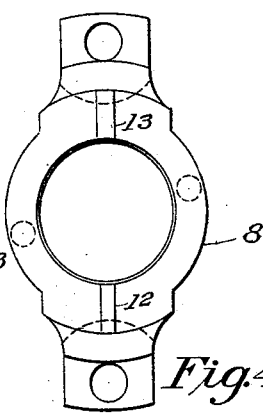
Fig. 4.
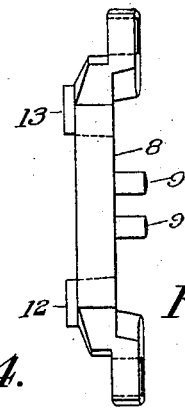
Fig. 5.
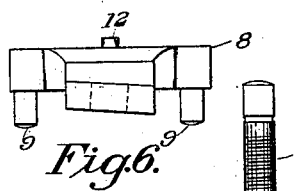
Fig. 6.
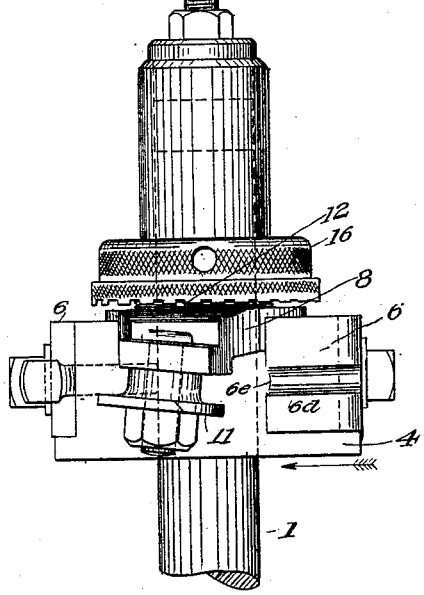
Fig. 2.
Fig. 3.
WITNESSES:
W. E. Prindle
B. M. Smith
INVENTOR
W. W. Philbrick,
BY
Geo. H. Parmelee,
his ATTORNEY.
THE NORRIS PETERS CO., PHOTO-LITHO., WASHINGTON, D. C.

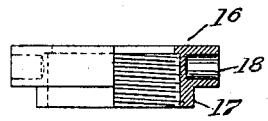
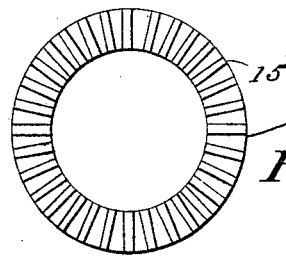
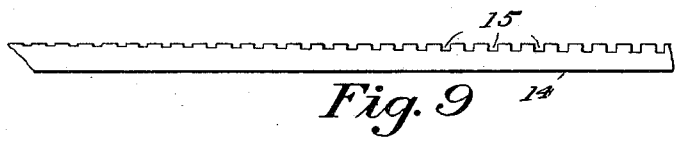
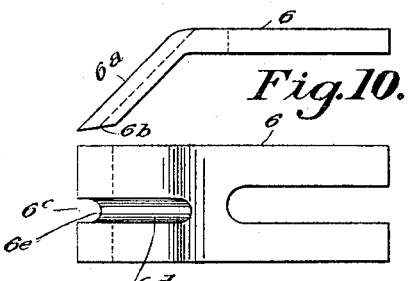
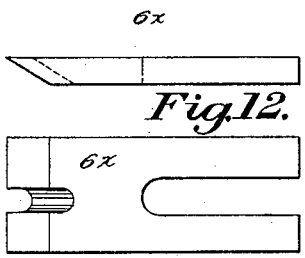
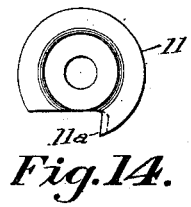
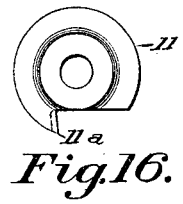
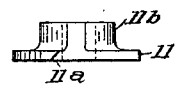
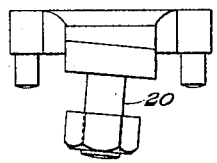

UNITED STATES PATENT OFFICE.

WARREN W. PHILBRICK, OF SEATTLE, WASHINGTON.

MATCHER-HEAD.

SPECIFICATION forming part of Letters Patent No. 681,458, dated August 27, 1901.

Application filed August 28, 1900. Serial No. 28,276. (No model.)

*To all whom it may concern:*

Be it known that I, WARREN W. PHILBRICK, of Seattle, in the county of King and State of Washington, have invented a new and useful Improvement in Matcher-Heads, of which the following is a full, clear, and exact description, reference being had to the accompanying drawings, which form a part of this specification.

This invention has relation to certain new and useful improvements in matcher-heads of that class which are described and claimed in my prior patents, Nos. 629,813, 629,814, 633,153, and 633,154, in which the work is divided between jointing blades or cutters which joint the vertical faces of the lumber and independent circular bits which form the tongue, groove, or other special configuration.

The present invention is more particularly designed to provide means of improved character for securing the adjustment of the circular bits or cutters.

With this and other minor objects in view my invention consists in the novel construction, arrangement, and combination of parts, all as hereinafter described, reference being had to the accompanying drawings.

In the drawings, Figure 1 is a plan view of a matcher-head embodying my invention and especially designed for use as a tonguing-head. Fig. 2 is a side elevation of the same. Fig. 3 is a section on the line 3 3 of Fig. 1. Figs. 4, 5, and 6 are respectively plan, side, and end views of the bit-carrier detached. Fig. 7 is a detail view, partly in section and partly in side elevation, of the adjusting-nut. Fig. 8 is an inverted plan view of the adjusting-ring, and Fig. 9 is a development thereof. Figs. 10 and 11 are respectively plan and side views of one of my improved jointing blades or cutters. Figs. 12 and 13 are similar views showing a different form of the same. Figs. 14, 15, 16, 17, and 18 are detail views of circular bits or cutters. Fig. 19 is a detail view of a circular bit for use on a groove-head, and Fig. 20 is a detail view showing a modified form of bit-seat.

The numeral 1 designates the usual shaft or spindle on which the head is mounted and secured by the screw 2.

3 is the usual adjusting-screw for the head. 4 is the body of the head, which is formed with the lateral seats 5 for the jointing-blades 6 and with the central seat 7 for the bit-carrier 8. This bit-carrier is in general similar to the one shown in my said patents and is more particularly like that shown in my Patent No. 633,153 in that it is provided with the fulcrum-lugs 9. These fulcrum-lugs rest in seats 10 in the body of the head, as best shown in Fig. 3, and are made of sufficient length to bring their fulcrum ends down into about the horizontal plane of the cutting edges of the circular bits 11, which are seated on the ends of the bit-carrier, as in the said patent. The purpose of thus extending these fulcrum-lugs is to prevent one of said bits swinging up and out and the other down and in when the bar is adjusted, as would be the case were the center of movement above the plane of the bits. The upper face of the bit-carrier is provided with the lugs 12 and 13 at opposite sides of the head, and upon these lugs rests an adjusting-ring 14. The under face of this ring is provided with a series of notches 15 of gradually-varying depth, as most clearly shown in the development, Fig. 9, and the lug 12 is made of the proper size to engage any one of the said notches. The lug 13, however, is made sufficiently broad not to enter the said notches.

16 is an adjusting-nut which is threaded on the hub portion of the head. This nut bears upon the ring 14 and is formed with a reduced portion 17, which fits within said ring, as shown in Fig. 3, thus giving the nut a more extended bearing and also protecting the thread from injury by the ring.

18 designates apertures in the nut for the engagement of a span-wrench or other suitable implement. By loosening this nut the ring 14 may be set so that the lug 12 will engage with any desired notch in the said ring, when by tightening said nut the bit-carrier will receive vertical adjustment corresponding to the depth of the particular notch—that is to say, the deeper the notch which is engaged by the said lug the greater will be the deflection of the bit-carrier from a horizontal plane. This adjustment effects the formation of a tongue (or in a grooving-head a groove) of any desired width or thickness, as is fully described in my prior patents. The notches are carefully graduated in depth, and in practice each is properly marked with figures indicating the adjustment effected thereby.

In Figs. 1, 10, and 11 the jointing-blades are shown as having their cutting end portions $6^a$ bent in the direction of rotation and ground off at $6^b$ to form their cutting edges. I have found that in this form of bit the cutting edges, being ground on the inside, wear back much more slowly than do the edges of the straight bits of my former patents, so that they require much less frequent adjustment to compensate for wear. These blades are also slotted at $6^c$ and grooved at $6^d$ to pass the tongue and also to form the rounded cutting or shaping edge $6^e$ at the inner end of the slot $6^a$. This edge $6^e$ imparts a rounded form to the vertical edge of the tongue and also counteracts any tendency of the circular bits to make one horizontal face of the tongue wider than the other in case one of said bits should happen to be filed with more hook at the point $11^a$ than the other one. Therefore much less care is required in filing the circular bits. The provision of this edge $6^e$ also makes these jointing-blades joint the entire vertical face of the lumber, by which I mean the vertical face of the tongue as well as the vertical faces above and below the tongue, while the tongue itself is formed by the action of the circular bits. This I believe to be an entirely novel result. The same improvement may be applied to the straight jointing-blades $6^x$, as shown in Figs. 12 and 13. The slot $6^c$ in the jointing-blades is made of sufficient width to pass a tongue of the maximum thickness provided for by the adjustment of the circular bits. To impart a counterpart configuration to the bottoms of the grooves I round the edges of the grooving-bits, as shown at 19 in Fig. 19. Figs. 14, 15, 16, and 17 show the two circular bits 11 for the tonguing-head in both plan and side elevation.

Since the clearance of the circular bits is determined by the inclination of the bit-seats and bit-securing bolts to insure greater accuracy instead of using independent securing-bolts, as shown in Fig. 2, I may form the bit-carrier with the integral studs 21. (Shown in Fig. 20.) Instead of forming the circular bits with the integral hub portions $11^b$ I may form them in two parts, as shown in Fig. 18—that is to say, a disk portion $11^c$ and a separate hub portion $11^d$.

It will be readily understood that the improvement in jointing-blades above described is applicable to the various forms of heads shown in my various prior patents and, in fact, to any head of the general type to which the said patents relate.

Having thus described my invention, what I claim, and desire to secure by Letters Patent, is—

1. In a matcher-head, the combination with the body of the head, having a diametrically-extending seat therein, and the bit-carrier fulcrumed in said seat, and having a lug or tooth on its upper face, of the adjusting-ring having a series of graduated notches, any one of which may receive the said lug or tooth, and the adjusting-nut bearing on the said ring.

2. In a matcher-head, the combination with the body of the head, having a diametrically-extending seat for a bit-carrier, a bit-carrier fulcrumed on said seat and having a lug or tooth, an adjusting-ring having a series of graduated notches any one of which may receive the said lug or tooth, and an adjusting-nut bearing upon the upper surface of the said ring and having a reduced portion extending through the ring and seating the same.

In testimony whereof I have affixed my signature in presence of two witnesses.

WARREN W. PHILBRICK.

Witnesses:
ARTHUR R. RUTHERFORD,
JOHN KELLEHER.